United States Patent [15] 3,650,768
Roberts [45] Mar. 21, 1972

[54] MAKING AMERICAN CHEESE FROM HEAT TREATED MILK

[72] Inventor: Miron J. Roberts, Glenview, Ill.

[73] Assignee: Kraftco Corporation, New York, N.Y.

[22] Filed: Feb. 27, 1970

[21] Appl. No.: 15,263

Related U.S. Application Data

[63] Continuation-in-part of Ser. No. 668,681, Sept. 18, 1967, abandoned.

[52] U.S. Cl. ...................................................99/116
[51] Int. Cl. ...................................................A23c 19/02
[58] Field of Search ...................................99/115, 116

[56] References Cited

UNITED STATES PATENTS 2,322,148  6/1943  Lane et al. ..............................99/116
2,531,329  11/1950  Farnham ................................99/116
2,793,122  5/1957  Erekson .................................99/116

OTHER PUBLICATIONS

Alford et al., Journal of Dairy Science, Vol. 33, 1950 (pp. 107, 112, 113 & 115- 119) SF221J8.

Primary Examiner—Lionel M. Shapiro
Assistant Examiner—D. M. Naff
Attorney—Fitch, Even, Tabin & Luedeka

[57] ABSTRACT

A method for making American cheese and similar types of cheese from heat treated milk so as to provide increased cheese flavor. In accordance with the method, a combination of a particular type of a proteolytic micrococcus and a particular type of lipase are added at specified levels to heat treated milk which is to be made into American cheese. A particular lactobacillus micro-organism may also be used in connection with the combination of the indicated proteolytic micrococcus and specified lipase to provide improved body, flavor and/or texture to the cheese.

13 Claims, No Drawings

MAKING AMERICAN CHEESE FROM HEAT TREATED MILK

This application is a continuation-in-part application of my copending application Ser. No. 668,681, filed Sept. 18, 1967 and entitled Method of Making American Cheese from Heat Treated Milk, which earlier filed application is now abandoned.

The present invention relates generally to a method of making cheese from heat treated milk and more particularly relates to a method for making American cheese and similar types of cheese, with improved flavor, from pasteurized milk.

The term heat treated milk, as used in this specification, refers to a milk which is subjected to heat treatment at least equivalent to heating the milk to 135° F. and cooling it down with no-hold at the temperature. The heat treated milk may be pasteurized, which is generally understood to mean that the milk tests phosphitase negative, or may be sterilized, which is generally understood to mean that the micro-organisms and enzymes are substantially or completely destroyed. As used in the cheese art, heat-treated (differentiated with a hyphen in this specification) milk is milk which has been heated to from 135° to 150° F. and cooled with no-hold. Such treatment generally destroys gas forming micro-organisms but is less than pasteurizing conditions and such treatment may be referred to herein as sub-pasteurizing.

American cheese, as used herein, is a term which identifies a group of cheeses which includes Cheddar cheese and Colby cheese and further includes Monterey and Jack cheeses. Cheddar cheese derives its name from a step in the manufacturing process wherein the drained cheese curd is cheddared or matted. While the present invention is sometimes described with particular reference to Cheddar cheese, it should be understood that the invention is applicable to cheese having similar curd characteristics, texture, and flavor, such as granular or stirred-curd cheese and washed-or soaked-curd cheese.

American cheese generally is a hard cheese, ranging in color from nearly white to a more traditional red-yellow color and is made from whole cow's milk. Many attempts have been made to make American cheese from heat-treated sub-pasteurized or pasteurized milk, and considerable research has been conducted in respect of American cheese made from heat-treated and pasteurized milk. For example, such technique is reported in the following articles: *Cheddar Cheese from Pasteurized Milk*, Price, Journal of Dairy Science, Vol. 10, pp. 155–168 (1927); *A Comparison of Three Methods of Pasteurizing Milk for Cheddar Cheese Making*, Price and Prickett, Journal of Dairy Science, Vol. 11, pp. 69–78 (1928); *Bacteriology of Cheese, I. Effect of Pasteurizing the Milk on the Nitrogenous Decomposition of Cheddar Cheese*, Lane and Hammer, Iowa State College Research Bulletin No. 183 (1935); *Occurrence of Micrococci in Cheddar Cheese Made from Raw and from Pasteurizied Milk*, Alford and Frazier, Journal of Dairy Science, Vol. 33, pp. 107–114 (1950); *Enhancement of the Flavor of Cheddar Cheese by Adding a Strain of Micrococcus to the Milk*, Robertson and Perry, Journal of Dairy Research, Vol. 28, pp. 245–252 (1961). It has also been known to increase the flavor of certain cheese by the use of enzymes as has been disclosed in U.S. Pat. No. 2,531,329. However, none of these prior references has provided a satisfactory disclosure for providing American cheese and similar types of cheese for commercial purposes and, prior to this invention, the use of pasteurized milk in the manufacture of American cheese had no commercial significance.

When Cheddar cheese, in particular, is made from heat-treated milk it is usually produced by a so-called, "time-schedule" method. Use of the time-schedule method makes it impossible to control the amount of acid that develops and the rate of acid development during the make procedure.

In accordance with known methods for making American cheese and similar types of cheese from sub-pasteurized milk, the milk is cooled after heat treatment to at least the setting temperature of from 86° to 88° F. and is run into a cheese vat. A starter of *Streptococcus lactis* is added and the milk is stirred, usually for about an hour as the milk develops acidity through bacterial action and this is known as ripening. The amount of starter is adjusted so that acid will develop at a desired rate during the make procedure and the time in the vat is controlled accordingly. Rennet and color, if desired, are mixed thoroughly into the ripened milk and stirring is stopped. The milk is permitted to set, i.e., form a coagulum of curd. When the curd is sufficiently firm, usually about thirty minutes after setting, it is cut with curd knives into cubes. It is then stirred continuously from the time of cutting until the whey is drained from the curd. After cutting, the curd is heated gradually over a period of about 30 minutes to a temperature of about 100° F.

The whey is drained after heating. The curd is then packed about 7 or 8 inches deep on each side. When the curd is firm enough to be turned without breaking, it is cheddared. That is, it is cut into slabs 5 or 6 inches wide which are turned frequently, and when firm enough, piled into layers. After cheddarring, the curd is then run through a curd mill and is spread over the bottom of the vat and stirred. Salt is mixed in and the curd is piled on either side of the vat while additional whey drains.

After salting and draining, the curd is transferred to cloth lined metal hoops and is pressed for about 30 minutes. The cheese is dressed and is pressed again for 12 to 24 hours. The cheese is then removed from the hoops, wrapped in a suitable material, and cured for a desired period, usually at least 60 days, sometimes for 3 to 6 months, and in some instances for a year or longer.

The above-described method is for producing Cheddar cheese from heat-treated or sub-pasteurized milk. However, the Cheddar cheese produced from heat-treated milk often lacks the flavor characteristically associated with Cheddar cheese produced from raw milk. The problem of flavor development becomes more difficult with pasteurized milk, i.e., as heat treatment is increased. It would be desirable to provide a method for producing American cheese and similar type cheese from heat-treated milk, pasteurized milk and milks having higher heat treatments with an improved American cheese flavor.

It is well known that heat treatment of milk destroys desirable micro-organisms and enzymes, as well as undesirable micro-organisms and enzymes. Various attempts have been made, as indicated in the aforementioned references, to provide desirable ripening agents for heat-treated and pasteurized milk so as to produce improved flavor in cheese made from heat treated milks. However, these attempts have not produced a cheese with an improved American cheese flavor suitable for commercial purposes.

Current cheese making practices involving accelerated aging or curing techniques particularly need the destruction of undesirable micro-organisms and enzymes in raw milk and even in heat-treated milk. The presence of undesirable micro-organisms can be accentuated with rapid curing of cheese thereby providing bad cheese. Accordingly, the need for destroying undesirable micro-organisms and enzymes in the manufacture of American cheese and similar types cheeses is even greater today.

It is an object of the present invention to provide an improved method for making American cheese and similar type cheese from heat treated milks. It is another object of the present invention to provide a method for making such cheese with increased flavor from heat treated milks. It is a further object of the invention to provide a method for making American cheese and similar type cheese from pasteurized milk and milk given higher heat treatments to provide cheese of improved flavor and body from such milks. Another object of the invention is to provide an improved method for making American cheese and similar type cheese with accelerated aging or curing.

These and other objects of the present invention will become more clear from the following detailed disclosure.

It has been found, in accordance with various of the features of the present invention, that a combination of a particular proteolytic micrococcus and a particular lipase, used at specified levels of addition to milk, given previous heat treatment, produces an American cheese with a higher cheese flavor and can provide a flavor equivalent to that obtained in American cheese produced from raw milk.

The proteolytic micrococcus is a particular micro-organism which provides controlled milk protein breakdown during curing of the cheese. However, the protein breakdown during curing of the cheese should not be so great as to produce a bitter flavor from too extensive breakdown of the milk protein. That is, the proteolytic activity of the proteolytic micrococcus should produce only a desired level of protein breakdown into amino acids, peptides and other related protein fragments.

The desired proteolytic micrococcus for the process of this invention is a *Micrococcus Cohn* selected from Subgroups 1 to 4, inclusive. The classification of *Micrococcus Cohn* and the manner of determination of the Subgroups is reported in *Identification Methods for Microbiologists*, Gibbs and Skinner (1966). The relative characteristics of *Micrococcus Cohn* Subgroups 1 through 4 are set forth in the following table:

|  | *Micrococcus Cohn* | | | |
|---|---|---|---|---|
| Subgroup | 1 | 2 | 3 | 4 |
| Pink pigment | − | − | − | − |
| Acid from Glucose: | | | | |
| (1) aerobic | + | + | + | + |
| (2) anaerobic | − | − | − | − |
| Coagulase | − | − | − | − |
| Phosphatase | − | − | − | − |
| Acetoin | + | + | + | + |
| Acid from: | | | | |
| (1) arabinose | − | − | − | + |
| (2) lactose | − | + | v | + |
| (3) maltose | v | + | + | + |
| (4) mannitol | − | − | + | + | v = variable

Thus, the proteolytic micrococcus to be used in accord with this invention will be acetoin positive and convert glucose to acid under aerobic conditions. It has been found that more preferred results are achieved with micro-organisms from *Micrococcus Cohn* Subgroup 2 and even more preferred results are obtained when the *Micrococcus Cohn* were from micro-organisms of Subgroup 2 which were obtained from raw milk.

It has been found that micro-organisms from *Micrococcus Cohn* Subgroups 5 through 8, inclusive, are not satisfactory for the production of the desired flavor in American cheese and similar types of cheese. Micro-organisms in these Subgroups 5 to 8, inclusive, are acetoin negative and some in these Subgroups are weak or negative in converting glucose to acid under aerobic conditions.

A preferred proteolytic micrococcus is a proteolytic micrococcus obtained from the University of Wisconsin and designated T–3. The cultural and biochemical characteristics of T–3 micrococcus are as follows:

| Catalase | + |
|---|---|
| Gram stain | + cocci in groups |
| Acid from glucose: | |
| aerobic | + |
| anaerobic | − |
| Coagulase | − |
| Phosphatase | − |
| Acetoin | + |
| Acid from: | |
| arabinose | − |
| lactose | + |
| maltose | + |
| mannitol | − |

Baird-Parker Classification: Group II

*Micrococcus Cohn*
Subgroup 2

Additional tests:

| Proteolysis | + |
|---|---|
| Pigment | white to yellow |
| NH$_3$ from arginine | − |
| Oxidase | + |
| Indole production | − |
| H$_2$S production | − |
| Motility | − |
| Hydrolysis of esculin | − |
| Lipolysis (Spirit Blue Agar) | v |
| Growth, 45° F. | + |
| 72° F. | + |
| 86° F. | + |
| 98° F. | + |
| 113° F. | + |
| Growth, NaCl 4% | + |
| 6% | + |
| 8% | + |
| 10% | − |
| Gelatin, liquefied | + (slow) |
| Growth, pH 4.2 | − |
| 9.6 | + |
| Litmus milk (86° F.) | |
| Acid (pink) | − |
| Dye reduction (white) | + |
| Coagulation | + |
| Nitrate Reduction | + |
| Acid from: | |
| cellobiose | − |
| dextrin | − |
| glycerol | − |
| inositol | − |
| inulin | − |
| levulose (d-fructose) | − |
| mannose | − |
| melezitose | − |
| melibiose | − |
| raffinose | − |
| rhamnose | − |
| salicin | − |
| sorbitol | − |
| sucrose | − |
| trehalose | − |
| xylose | − |
| Thermal death time: | |
| 161° F./15 sec. | + |
| 161° F./26 sec. | + |
| 161° F./28 sec. | − |
| 170° F./15 sec. | + |
| Recovery from cheese: | (×10³/ gram) |
| After starter | 33 |
| After ripening | 10 |
| After cutting | 270 |
| After heating | 1300 |
| After cheddaring | 3000 |
| After salting | 2100 |
| After 24 hrs. | 93.5 |
| After 1 wk. | 66.8 |
| After 2 wks. | 3.5 |
| After 4 wks. | 0.92 |
| After 9 wks. | 0.34 |
| After 12 wks. | 0.62 |
| After 4 months | + |
| After 5 months | + |
| After 6 months | + |
| After 10½ | + |

It has been found that when the *Micrococcus Cohn* Subgroups 1 to 4, inclusive, micro-organisms are added in the manufacture of American cheese from pasteurized milk there is a clear contribution to the cheese flavor as compared to the flavor produced in cheese from pasteurized milk without the addition of these micro-organisms. It has also been found that this improvement is noticeable under accelerated curing conditions.

The proteolytic micrococcus may be added to the heat treated milk as a culture or may be formed into a concentrated bacterial cell paste prior to addition.

Proteolysis of the milk protein in the cheese, to provide the desired breakdown of protein, occurs primarily during curing of the cheese curd. The amount of proteolysis is related to the level and type of micro-organisms present during curing, as well as the curing conditions. Growth of the micrococcus is slowed after addition of the *S. lactis* starter culture to the milk due to the formation of lactic acid and the level of the micrococcus is determined primarily by the level of addition to the milk.

While not wishing to be bound by any theory, it is believed that the micrococcus continues to grow slowly under the acidic conditions present during curing of the cheese. In this connection, it is further believed that the proteolytic activity of the micrococcus is primarily due to products produced by and during the growth of the micrococcus. It is believed that a produce so produced acts to break down the protein to a desired level and does not continue to break down protein to undesired by-products. In other words, the system seems to be self-limiting as to the proteolytic activity.

The proteolytic micrococcus of the invention, as described above, is desirably added at levels so as to provide from about $1 \times 10^7$ to about $1 \times 10^{10}$, preferably $1 \times 10^9$, cells per pound of milk at the time of addition of the starter culture. This level of micrococcus may be established by adding a relatively low level of viable micrococcus and allowing a relatively long period of time for growth of the micrococcus prior to addition of the starter culture. However, growth of the micrococcus during long periods of time is somewhat unpredictable and it is generally preferred to limit the period of time after addition of the micrococcus and prior to addition of the starter culture to about one hour or less. During such relatively short periods of time the micrococcus primarily undergoes an adjustment to the milk environment and little growth occurs.

The level of addition of the micrococcus is, of course, dependent on the time allowed for growth. For example, to achieve the preferred range of cells per pound of milk of the micrococcus for a growth period of less than about one hour requires the addition of from about 0.1 percent to about 0.5 percent by weight of the milk of a liquid culture containing about $2.0 \times 10^8$ cells of viable micrococcus per milliliter. Such level of addition of viable micrococcus may also be accomplished by adding a smaller amount of a cell paste of the micrococcus. When the proteolytic micrococcus described above is used along with heat treated milk, there is a tendency to produce undesired flavor. However, it has been found, in accordance with the present invention, that the use of the particular proteolytic micrococcus in combination with a specified lipase produces a desirable American cheese flavor. The lipase will be an enzyme which splits fat into fatty acids and glycerol. In this connection, it is desirable to add a lipase of a type and at a level such that the fat is selectively split into fatty acids and glycerol. The lipase should be added in sufficient amount to contribute to the flavor but should not be added at such a high level as to provide a rancid flavor. At levels of addition of the particular lipase above about 2 grams of dry powdered enzyme preparation per 1,000 pounds of milk, a rancid flavor may be produced. At levels of addition below about 0.1 grams per 1,000 pounds of milk that is little flavor contribution from the particular lipase, and an undesired flavor may be produced by the proteolytic micrococcus. The lipase is preferably added at a level of 0.25 grams per 1,000 pounds of milk.

The particular lipase for use in the practice of this invention is that obtained by extraction from the throat tissue of calves. Other suitable lipase may be obtained by extraction from the throat tissue of lambs or kids. These enzymes are commercially available and their manufacture is generally disclosed in U.S. Pat. Nos. 2,531,329 and 2,794,743. These particular lipases, while known for use in cheese manufacture, work synergistically with the particular micrococcus micro-organisms of the invention to provide the desired curing of American cheese and the resultant flavor. Other enzymes than those specified herein do not give cheese of desired flavor. The lipases contemplated herein are self-limiting in the hydrolysis of milk fat and do not break down such fat to undesired end products. Such lipases will be referred to herein as "self-limiting lipases" to denote their restricted hydrolizing activity.

When American cheese or similar type cheese is produced from heat treated milk, to which the above described combination of a proteolytic micrococcus and the lipase is added, the cheese has a desirable Cheddar cheese flavor. However, the body and texture of the cheese may be soft or crumbly or otherwise undesirable from some purposes. It has further been found that an improved body and texture can be provided when a lactobacillus or a closely related micro-organism is also added to the heat-treated milk prior to setting of the milk. Such a lactobacillus may be referred to as a bodying micro-organism. Addition of such a micro-organism is optional, but may be used where a particular body or texture is desired. Some of such lactobacillus micro-organisms also provide flavor to the cheese. Various homofermentative lactobacilli may be used, such as *Lactobacillus lactis* and *Lactobacillus bulagricus*. The preferred lactobacillus micro-orgamism is a strain of *L. lactis*. The lactobacillus micro-orgamism will usually have some proteolytic activity and may contribute some flavor to heat-treated milk used to make cheese in accordance with the described method. The preferred lactobacillus micro-organisms will develop from 1.0 to 2.0 percent acid in milk. However, as previously stated, the lactobacillus micro-organism is primarily used when it is desired to provide particular body and texture characteristics.

The preferred micro-organism is known as $Lb_7$ and it has been identified as ATCC 7995. This micro-organism exhibits the following characteristics:

| | |
|---|---|
| Temperature for growth | |
| 15° C. | − |
| 22° C. | + |
| 37° C. | + |
| 45° C. | + |
| 55° C. | + |
| Microscopic Evaluation | + Rod |
| Granules | + |
| Colony Appearance | Rough |
| NH₃ from Arginine | − |
| Lipolytic (Spirit Blue) | − |
| Catalase | − |
| Litmus Milk: Acid Dye | + |
| Reduct. | + |
| Coagulation | + |
| % Acid in Milk | 1.74 |
| pH | 3.3 |
| Acid from: Galactose | ± |
| Glucose | + |
| Lactose | + |
| Maltose | ± |
| Mannitol | − |
| Salicin | + |
| Sorbitol | − |
| Sucrose | ± |
| Trehalose | + |

When used, the lactobacillus or closely related micro-organism, is added as a milk culture or the micro-organism. The milk culture is obtained by adding the lactobacillus micro-organism to a suitable substrate and permitting growth of the micro-organism to proceed until an equivalent lactic acid acidity of 1.0 percent to 2.0 percent is obtained. The milk culture of the lactobacillus micro-organism is then added to the heat treated milk which is to be made into cheese at a level of from about 0.1 to about 0.3 percent by weight of the milk. At levels above the stated range, an undesired flavor is sometimes detected. At levels below the stated range, there is little contribution to the body or texture of the cheese produced from the heat treated milk.

As stated above, the flavor contribution from the proteolytic micrococcus may be due to an enzymatic reaction wherein an enzyme is produced as a product by the micrococcus during curing of the cheese. In another embodiment of the present invention, such enzyme may be extracted from a proteolytic micrococcus culture prior to treatment of the heat treated milk to produce cheese. For this embodiment, the extracted enzyme is added directly to the milk which has been heat treated and before setting of the milk. It is added at a level equivalent to that which would be provided by the proteolytic micrococcus if present.

Various tests have been specified in the foregoing. These tests are generally standard and recognized tests so that this specification has not been elaborated with details as to test procedures.

The following examples further illustrate various features of the present invention but are intended in no way to limit the scope of the invention which is defined in the appended claims.

EXAMPLE I

Twenty-five thousand pounds of raw milk was heat treated at a temperature of 162° F. for a period of 16 seconds to effect pasteurization thereof. The milk was pumped to a vat and allowed to cool to 88° F. To the cooled, heat-treated milk as added 50 pounds of a milk starter culture including a proteolytic micrococcus. The culture contained $1.75 \times 10^8$ cells per gram of a proteolytic micrococcus. The proteolytic micrococcus culture was one which had been obtained from the University of Wisconsin, designated as T-3. To the milk was also added 6.25 grams of a lipase which had been obtained by extraction from the throat tissue of a calf. After addition of the above culture and the lipase enzyme, 250 pounds of a *Streptococcus lactis* starter culture was also added to the milk.

The milk was agitated and allowed to ripen for a period of one hour. Seventy-five ounces of a rennet solution were then mixed into the ripened milk, and the stirring was stopped. After about 30 minutes the curd was sufficiently firm to cut and was cut with curd knives into quarter-inch cubes. Stirring was then commenced and was continued until the whey was drained. Draining was completed in about 30 minutes, and thereafter the curd was packed in a layer about 7 or 8 inches deep on each side. When the curd was firm enough to be turned without breaking, it was cheddared. The curd was then run through a curd mill and was spread evenly over the bottom of a vat and stirred. Three pounds of salt for each one thousand pounds of milk were then mixed in and the curd was piled on each side of the vat while additional whey was drained.

After salting, the curd was transferred to cloth-lined metal hoops, and was pressed, dried and wrapped in a plastic film in accordance with conventional procedures.

After wrapping, the cheese was stored in a warehouse at a temperature of 45° F. to effect curing. The cheese was cured for a period of 6 months. At intervals of 2 months a sample of the cheese was removed and inspected.

The samples of cheese which had been prepared in accordance with the above procedure were compared with samples of cheese which had been prepared in a similar manner from the same milk with the exception that the combination of a proteolytic micrococcus and a lipase enzyme of the present invention was not added to the heat-treated milk prior to setting. In all cases, the samples of cheese produced by the above described method of the invention were scored considerably higher in flavor than the control samples. The body and texture of the cheese produced by the above method was acceptable.

EXAMPLE II

Heat-treated milk was prepared for use in making Cheddar cheese in accordance with the procedure of Example I with the exception that 50 pounds of a liquid milk culture of *L. lactis* was also added to the heat-treated milk prior to setting of the milk. The *L. lactis* milk culture was prepared by introducing a stock culture into skim milk and permitting growth to proceed until an acidity of 1.6 percent equivalent lactic acid was reached. The *L. lactis* stock culture was a strain obtained from the U.S.D.A. and designated $Lb_7$ (ATCC 7995). Cheddar cheese was then produced in accordance with the procedure of Example I. Samples of Cheddar cheese prepared in accordance with the above procedure were compared with sames of Cheddar cheese which had been prepared in a similar manner from the same heat-treated milk but without the addition of the micrococcus, *L. lactis*, or enzyme of the present invention. In all cases the samples of cheese produced by the above method were scored considerably higher in flavor than the control samples and were scored equal or better in body and texture.

EXAMPLE III

A cell paste of the proteolytic micrococcus used in Examples I and II was prepared by the following procedure: 200 milliliters of a viable culture of the proteolytic micrococcus was added to 30 liters of sterilized medium of the following composition to provide an inoculum.

| Dry Ingredients | Amount, grams |
| --- | --- |
| Infusion of calf brains | 473 |
| Infusion of beef heart | 592 |
| Peptone | 23.7 |
| Dextrose | 4.7 |
| Sodium Chloride | 11.8 |
| Di Sodium Phosphate | 5.9 |
| Water | 30 liters |

The inoculum was incubated for two days at 86° F. to provide a culture of the proteolytic micrococcus. The culture was then transferred to an additional 600 liters of sterile media of the same composition as previously described and incubation was continued for 2 days at 86° F.

The culture was then centrifuged to provide 2,600 grams of concentrated cell paste containing $121 \times 10^9$ viable cells of proteolytic micrococcus per gram.

Cheddar cheese was then made in accordance with the procedure of Example II with the exception that eight grams of the proteolytic micrococcus cell paste were used per 1,000 pounds of milk instead of a culture of the proteolytic micrococcus. The Cheddar cheese was comparable in every respect with the Cheddar cheese produced by the method of Example II.

EXAMPLE IV

Cheddar cheese was prepared in accordance with Example II except that the proteolytic micrococcus was another organism than T-3 but was a *Micrococcus Cohn* from Subgroup 2 derived from raw milk. The resulting cheese was substantially better than the control which was made by the same procedure except that the *Microccocus Cohn* micro-organisms were omitted.

EXAMPLE V

Cheddar cheese was prepared in accordance with Example II except that the proteolytic micrococcus was a *Micrococcus Cohn* from Subgroup 2 derived from pasteurized milk. The resulting cheese did not score as well as the cheese of Examples II and IV but were better than control described in Example IV.

The American cheese from pasteurized milk can be slow cured or fast cured with the added micro-organisms and enzyme. When such cheese is made from raw milk, undesired micro-organisms frequently develop to such degree as to provide unwanted flavors and bad cheese. The ability to accelerate curing with more uniform cheese resulting is a marked advantage of the invention.

From the above it can be seen that the described method provides American cheese from heat treated milk with improved flavor and with good body and texture.

I claim:

1. A method for producing American cheese from heat treated milk wherein the milk is inoculated with a lactic acid producing culture and is thereafter set, which comprises adding prior to curing of the cheese a proteolytic micrococcus selected from Micrococcus Cohn subgroups, 1, 2, 3, and 4, a self-limiting lipase, and a lactobacillus bodying micro-organism.

2. The method for producing American cheese from heat treated milk of claim 1, wherein the proteolytic micrococcus and the lipase are added to the milk prior to setting of the milk.

3. The method for producing American cheese in accordance with claim 1 wherein the heat treatment effects pasteurization of the milk.

4. The method in accordance with claim 1 wherein the proteolytic micrococcus is from *Micrococcus Cohn* Subgroup 2.

5. The method in accordance with claim 1 wherein the proteolytic micrococcus is T-3.

6. The method in accordance with claim 2 wherein the proteolytic micrococcus is added at a level of between about $1 \times 10^7$ to about $1 \times 10^{10}$ cells per pound of milk.

7. The method in accordance with claim 6 wherein the level of proteolytic micrococcus is about $1 \times 10^9$ cells per pound of milk.

8. The method of claim 2 wherein the lipase is added at a level sufficient to contribute flavor and at a level below which a rancid flavor occurs.

9. The method of claim 8 wherein the lipase is added at a level between about 0.1 grams per 1,000 pounds of milk and about 2 grams per 1,000 pounds of milk.

10. The method of claim 9 wherein the lipase is added at a level of about 0.259 grams per 1,000 pounds of milk.

11. The method of claim 1 wherein the bodying micro-organism is a *lactobacillus lactis* or a *lactobacillus bulgaricus*.

12. The method of claim 1 in which the bodying organism is a lactobacillus which develops from 1.0 to 2.0 percent acid in milk.

13. The method of claim 11 wherein the micro-organism is lactobacillus lactis and develops from 1.0 to 2.0 percent acid in milk.

* * * * *